(12) United States Patent     (10) Patent No.: US 12,700,790 B1

Childs et al.     (45) Date of Patent: Aug. 4, 2026

(54) MATRIX REGULATION CONTROL

(71) Applicant: Renesas Design (UK) Limited, Bourne End (GB)

(72) Inventors: Mark Jonathan Childs, Cirencester (GB); Davide Bianchi, Swindon (GB); Julian Tyrrell, Swindon (GB)

(73) Assignee: Renesas Design (UK) Limited, Bourne End (GB)

( * ) Notice: Subject to any disclaimer, the term of this patent is extended or adjusted under 35 U.S.C. 154(b) by 0 days.

(21) Appl. No.: 19/079,936

(22) Filed: Mar. 14, 2025

(51) Int. Cl.
    *H02M 1/00*     (2007.01)
    *H02M 3/04*     (2006.01)

(52) U.S. Cl.
    CPC ....... *H02M 1/0067* (2021.05); *H02M 1/0045* (2021.05); *H02M 3/04* (2013.01)

(58) Field of Classification Search
    CPC .... H02M 1/00; H02M 1/0067; H02M 1/0045; H02M 3/04
    See application file for complete search history.

(56) References Cited

PUBLICATIONS

"Voltage-Regulator IC Brings Vertical Power Delivery to Big AI Chips", James Morra, Oct. 22, 2024. 14 pages, https://www.electronicdesign.com/technologies/power/article/55237347/electronic-design-empowers-voltage-regulator-ic-enables-vertical-power-delivery-for-ai-chips.

*Primary Examiner* — Robert L Deberadinis
(74) *Attorney, Agent, or Firm* — SCULLY, SCOTT, MURPHY & PRESSER, P.C.

(57)        ABSTRACT

A power provision device including: a load element; a power supply plane configured to provide current to the load element; a plurality of power supply elements configured to provide current to the power supply plane; wherein each power supply element is configured to provide a current corresponding to a plurality of selectable current values to the power supply plane via an individual power connection; and wherein each of the plurality of power supply elements comprises a controller configured to control the power supply element to: transmit information to and receive information from other power supply elements of the plurality of power supply elements; select a current value based on information received from other power supply elements, wherein the information includes a current supplied by the other power supply elements; and output a current corresponding to the selected current value.

17 Claims, 5 Drawing Sheets

(b)

MATRIX REGULATION CONTROL

The present disclosure relates to a managing current output of a matrix of power supply elements with multiple current levels.

BACKGROUND

Advancements in the field of processor chips have led to processors such as CPUs and GPUs becoming larger and more powerful, and therefore requiring more current input and higher powered supplies which, in turn, leads to larger processor chips which draw very high currents.

Additionally, chips designed for use in AI applications can be very large and can draw currents over 1000A. These chips are not typically divided into cores, and thus the high current must be provided as a single rail. An example of such a chip is shown in FIG. 1. This may require a very high number of IVR phases (for example, over 100), for which conventional control is unsuitable because the control signal from the central controller of the chip must be fanned out to every phase causing a routing problem.

Lately, Integrated Voltage Regulators (IVR) have been used to supply CPUs. In this scheme, the regulators are placed in the same package as the CPU which can help reduce the input-current to the CPU package, and so reduce the demands on the conventional buck converters supplying the IVRs.

However, IVRs typically supply only moderate load currents (<10A) per-phase, so an AI processor might need several hundred IVR phases to support the maximum load current.

Current IVR architectures are not suitable for this many phases, and thus, a suitable solution is desired.

SUMMARY

According to a first aspect of the disclosure, there is provided a power provision device comprising: a load element; a power supply plane configured to provide current to the load element; a plurality of power supply elements configured to provide current to the power supply plane; wherein each power supply element is configured to provide a current corresponding to a plurality of selectable current values to the power supply plane via an individual power connection; and wherein each of the plurality of power supply elements comprises a controller configured to control the power supply element to: transmit information to and receive information from other power supply elements of the plurality of power supply elements; select a current value based on information received from other power supply elements, wherein the information includes a current supplied by the other power supply elements; and output a current corresponding to the selected current value.

Optionally, wherein the plurality of power supply elements are disposed on a single plane such that each power supply element has at least one neighbor power supply element;

wherein a neighbor power supply element is a power supply element that is orthogonally and/or diagonally adjacent.

Optionally, wherein the plurality of selectable current values comprise a range of stepped current values;

wherein the current values are stepped by a predetermined interval.

Optionally, wherein the current value is selected by each power supply element such that it is within a predetermined number of intervals of each neighbor power supply element.

Optionally, wherein the current value is selected by each power supply element such that it is at most one interval higher or lower than the current value provided by neighboring power supply elements.

Optionally, wherein a minimum selectable current value represents a maximum efficiency; and wherein a maximum selectable current value represents a maximum current output.

Optionally, wherein each power supply element comprises a plurality of input ports for receiving the information from neighbor power supply elements; wherein the number of input ports corresponds to a maximum number of neighbor power supply elements.

Optionally, wherein each power supply element has up to six neighbors.

Optionally, wherein when a power supply element has less than a maximum number of neighbors, the power supply element is configured to select a current value based on a maximum current value for each input port that is not connected to a neighbor power supply element.

Optionally, wherein the information is transmitted and/or received to and/or from neighbor power supply elements of neighbor power supply elements based on the information that is being transmitted and/or received.

Optionally, wherein the information includes at least one of: temperature data; current output data.

Optionally, wherein the current value is selected based on a comparison between a voltage feedback signal and a predetermined target output current;

wherein the voltage feedback signal is received by the power supply element from a voltage feedback connection between the power supply element and the power supply plane or load element.

Optionally, wherein each power supply element has up to four orthogonally adjacent neighbor power supply elements.

According to a second aspect of the disclosure, there is provided a method of configuring a current output for a power supply element that is part of a plurality of power supply elements of a power provision device, the method comprising:

transmitting and receiving information from other power supply elements of the plurality of power supply elements; and selecting a current value based on the received information, wherein the information includes a current supplied by the other power supply elements;

outputting a current corresponding to the selected current value.

Optionally, wherein the information is transmitted to and received from neighbor power supply elements;

wherein a neighbor power supply element is a power supply element that is orthogonally and/or diagonally adjacent to the power supply element.

Optionally, wherein the information comprises data representing a state of the power supply element and a request to increase or decrease a current output by the neighbor power supply elements.

Optionally, wherein the current output by the power supply element is limited by the current output by the neighbor power supply elements.

BRIEF DESCRIPTION OF THE DRAWINGS

The disclosure is described in further detail below by way of example and with reference to the accompanying drawings, in which.

DETAILED DESCRIPTION

In a system where a very large number of phases (>100) is required to supply a single load (>1000A) the use of a conventional controller is not ideal. A conventional controller uses linear control to control the output-current of the regulator to regulate the output voltage. In a multiphase buck converter, the output current of each phase is controlled in a linear way, and the number of active phases is also controlled. Typically, as the load is increased from zero, a single phase will increase its output current to match the load, until that phase exceeds the load at which peak efficiency is obtained. At that point additional phases are enabled. Once additional phases are enabled, as the load increases further, the output current of all the phases increases to match the load. This may be repeated until all phases are active.

This regulation scheme ensures high efficiency and good performance for voltage converters with a small number of phases (<16).

For a very high load current, from a very large undifferentiated digital circuit (such as an AI accelerator) the conventional approach can raise significant issues. The greatest issue is routing sufficient current into the CPU footprint through the limited available peripheral width. The fundamental issue is that the load-current the AI accelerator will draw is proportional to the area of its digital circuitry. For a roughly square accelerator, this will increase with the square of the edge dimension of the chip, whereas the available width of the chip available to route the power into the accelerator only increases proportionally with the edge dimension. The current density along the chip periphery therefore presents an issue as accelerator chips get larger.

To address this issue voltage converters can be placed below the accelerator chip and power may be provided vertically through the PCB, direct to the load.

This scheme has proven successful for CPUs, where the CPU typically consists of several "cores". Each core may require a supply <100A which can be provided by a small number of IVR phases, suitable to be controlled using a conventional controller architecture.

Figure 1:
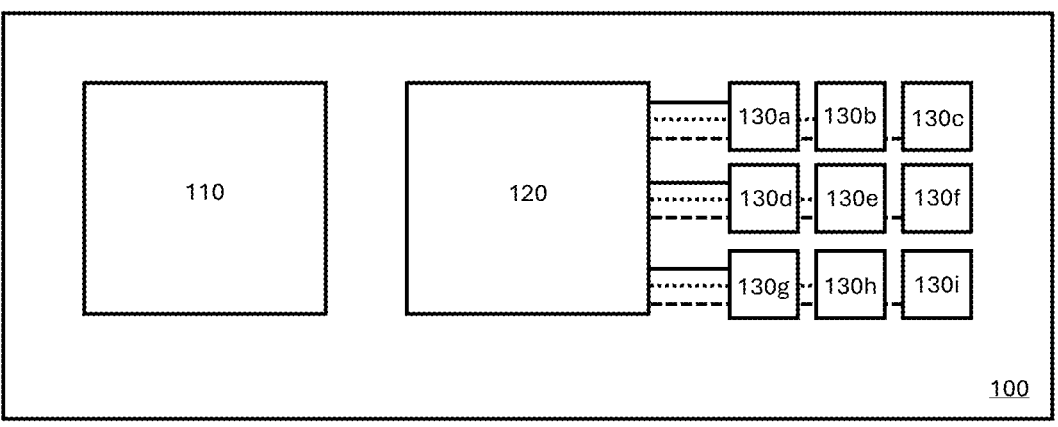
FIG. 1 is a block diagram of a power provision device according to the present disclosure.

FIG. 1 is a block diagram representing a power provision device 100 according to the present disclosure. The power provision device 100 may be a device wherein voltage converters (herein known as power supply elements) are positioned below a power supply plane and load element and provide power vertically through the power supply plane to the load element.

The power provision device 100 comprises a load element 110, a power supply plane 120 configured to provide a current to the load element; and a plurality of power supply elements 130a-130i configured to provide a current to the power supply plane 120.

The load element 110 may be a processor core, such as a CPU or GPU core. Although one load element is shown, it should be understood that a power provision device according to the present disclosure may include more than one load element.

The power supply plane 120 may be a non-ideal resistive plane. The power supply plane 120 may be made of a conductive material. For example, the power supply plane 120 may be made of copper. Alternatively, the power supply plane 120 may be an ideal plane with zero impedance.

The power supply plane 120 acts as a voltage rail, providing current to the load element (or load elements, in some examples). In addition to the power supply plane 120, a further plane (not shown) may be provided which acts as a ground rail.

Although nine power supply elements 130a-130i are shown, it should be understood that the power provision device 100 may comprise more or fewer than nine power supply elements.

Connections between the plurality of power supply elements 130a-130i and the power supply plane 120 are shown by the solid, dotted, and dashed lines. A connection between the power supply plane 120 and the load element 110 is also shown. It should be understood that the connections shown are merely illustrative, and may be configured differently.

The plurality of power supply elements 130a-130i are connected in parallel to the power supply plane 120. Each of the plurality of power supply elements 130a-130i are configured to supply a voltage to the power supply plane 120 via a power connection. That is, each power supply element of the plurality of power supply elements 130a-130i is individually connected to the power supply plane 120. The power connection may be multiple physically separate vias or wires.

The connections may be wired connections, or any other suitable connection.

The plurality of power supply elements 130a-130i may be power converters. The plurality of power supply elements 130a-130i may be multi-phase buck converters. The plurality of power supply elements 130a-130i may also be referred to as "phases".

Each power supply element of the plurality 130a-130i is configured to provide a current corresponding to one of a plurality of selectable current values to the power supply plane via the power connection.

Each power supply element of the plurality 130a-130i comprises a controller. Each power supply element may be configured to receive a feedback signal from a same physical point on the power supply plane 120 that the power supply element supplies its output current to, the feedback signal indicating a voltage provided by the power supply element. This allows each power supply element to regulate the power it is supplying to the power supply plane. Thus, if there is a localised voltage drop due to higher local loading from the load this can be directly addressed by the plurality of power supply elements 130a-130i. Additionally, each power supply element is independent of every other power supply element, allowing each power supply element to control only its own local output.

That is, there may be no centralised controller, eliminating the requirement to route a central control signal to each power supply element. This allows simplified layouts to be provided, which use a reduced amount of signals routed across the power domain.

Given that each power supply element of the plurality comprises a controller, it is highly beneficial to simplify those controllers. For example, in the case of an AI accelerator (as discussed above), it may be the case that more than one hundred power supply elements are in use at any one time. With so many power supply elements being enabled and disabled, the total current supplied is highly dependent on how many power supply elements are active. Thus, it is desirable to provide a system wherein each power supply element acts as a fixed current source and is enabled or disabled according to a demand of the load element. For example, in a system comprising 256 power supply elements, if each power supply element is a fixed current source, controlling how many phases are active would provide 8-bit resolution power regulation.

A technical benefit of this is that the random offset present in the power supply elements would provide a degree of dither, thereby providing a degree of linear regulation to the power provision device as a whole. That is, if the power plane is ideal and has zero impedance, every point on the plane will be at the same voltage. As this output voltage drops close to the target voltage the power supply elements with the most positive offset in the device will enable first, providing a small amount of total output current. If the load is increased, causing the voltage top drop further, more power supply elements will be enabled. Finally, at maximum load the output voltage will drop far enough to enable the power supply elements with the maximum negative offset in their comparator, and all power supply elements will be enabled.

It may be further considered that a drawback of the above discussed scheme is that when the output current of each power supply element is fixed to the maximum current the power supply element can output (as would be the case with a simple enable/disable scheme), the efficiency will be low.

As such, it may be considered that an efficiency of a single power supply element is significantly lower than a peak efficiency. As such, it may be further considered that efficiency can be optimised by providing a current corresponding to the peak efficiency rather than providing maximum current.

Thus, it is beneficial to define to possible output currents that each power supply element can supply. A first current value may correspond to a peak (or maximum) efficiency; and a second current value may correspond to a maximum output current. For example, the first current value may be 1.25A while the second current value may be 5A.

To optimally control an operating point current of each power supply element, neighbouring power supply elements may be monitored such that each power supply element may selected only a current higher than minimum settings of neighbouring power supply elements. This will now be described.

Figure 2:
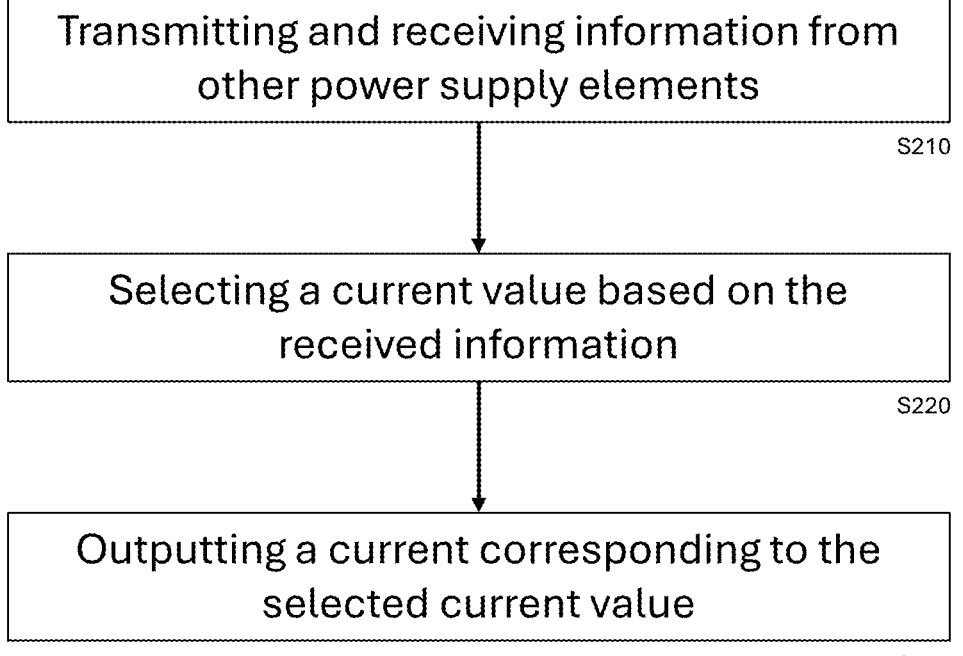
FIG. 2 is a flowchart showing a method of operating a power supply element according to the present disclosure

FIG. 2 is a flowchart illustrating a method carried out by a power supply element of a power provision device (such as power provision device 100 described by reference to FIG. 1), wherein the power supply element is one of a plurality of power supply elements (such as power supply elements 130a-130i described by reference to FIG. 1).

In step S210, the power supply element is configured to transmit and receive information from other power supply elements.

For example, the information may include current values representing a current that is currently being output by the power supply element, a current that is currently being output by the other power supply elements, a target current to be output by the power supply elements, and/or a requested current to be output by the other power supply elements.

A further example of data that may be included in the information is temperature information. For example, the power supply element may transmit information including its temperature to the other power supply elements, wherein the information may indicate that the power supply element requires cool down by outputting a smaller current value, thus requiring the other power supply elements to output a higher current value.

The information may include a request from the power supply element to the other power supply elements. For example, the request may be a request to increase or decrease an output current value.

Depending on the type of information being exchanged by the plurality of power supply elements, each power supply element may be configured to transmit and receive information only from neighbour power supply elements (that is, power supply elements that are directly connected to each other). In other examples, however, it may be the case that each power supply element is configured to communicate with power supply elements that are neighbours of neighbours, or neighbours of neighbours of neighbours, and so on. The information may be transmitted and/or received to and/or from neighbour power supply elements of neighbour power supply elements based on the information that is being transmitted and/or received.

For example, if the information comprises temperature data, it may be beneficial for the information to be more widely shared than only to neighbour power supply elements. In this case, the information may be transmitted from the power supply element to neighbour power supply elements and on to neighbour of neighbour power supply elements, and so on.

The other power supply elements may be neighbouring power supply elements. For example, the plurality of power supply elements may be disposed on a single plane such that each power supply element has at least one neighbour power supply element. A neighbour power supply element may be a power supply element that is orthogonally and/or diagonally adjacent to the power supply element. This is described in more detail with regard to FIGS. 3A and 3B.

Figure 3A:
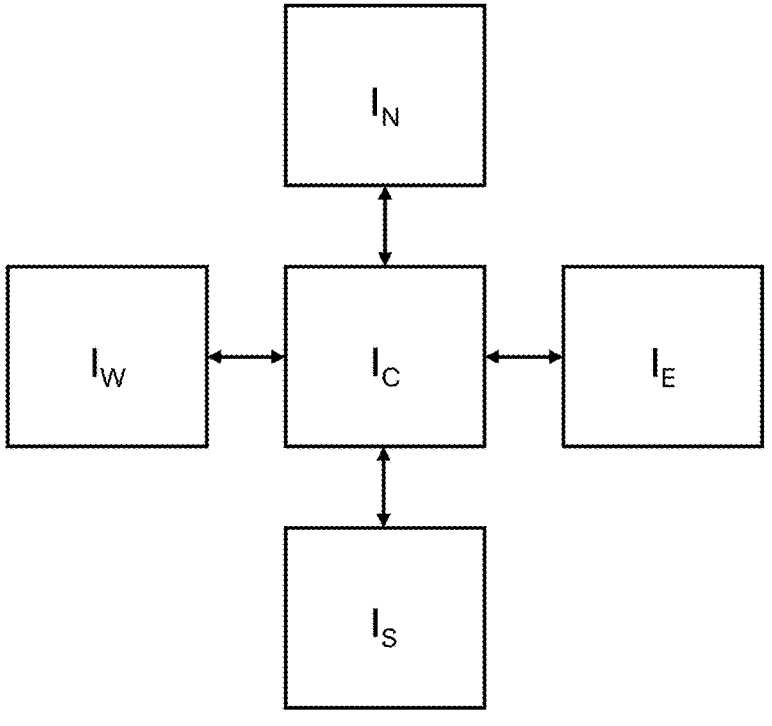
FIG. 3A is a diagram illustrating an example layout of a plurality of power supply elements.
Figure 3B:
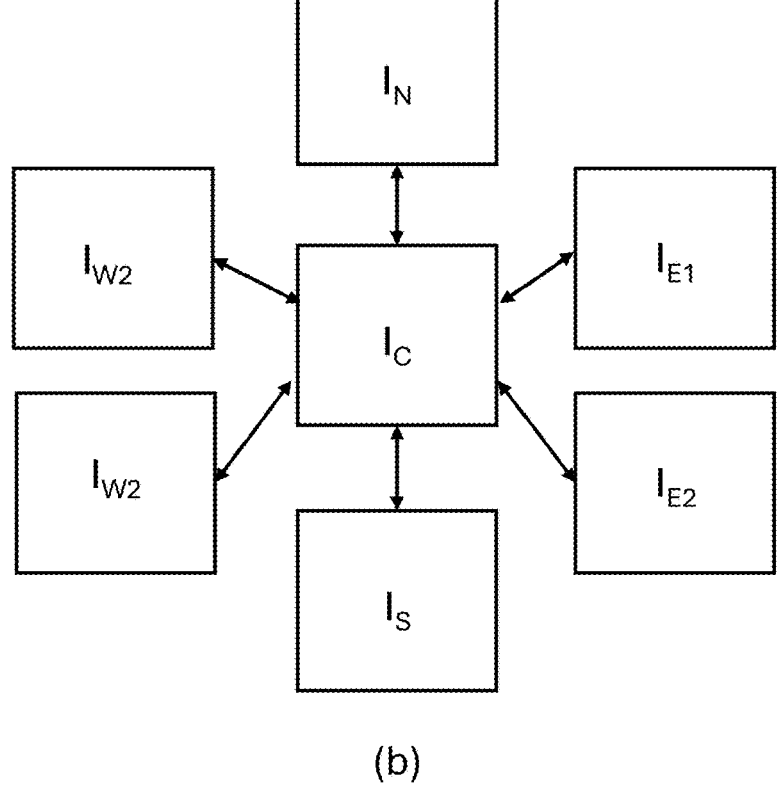
FIG. 3B is a diagram illustrating an example layout of a plurality of power supply elements.

FIGS. 3A and 3B show two examples, respectively, of a power supply element IC in a positional arrangement with neighbour power supply elements. The power supply elements illustrated in FIGS. 3A and 3B may be the same as the power supply elements described with regard to FIGS. 1 and 2.

In an example shown in FIG. 3A, the neighbour power supply elements are each (directly) orthogonal to the central power supply element. Thus, each power supply element may have a maximum of four neighbour power supply elements. Each power supply may then have a maximum of sixteen so-called "next door but one neighbour" or "neighbour of neighbour" power supply elements, which are power supply elements that are orthogonal to the neighbour power supply elements of the power supply element labelled Ic.

In an example shown in FIG. 3B, the neighbour power supply elements are each either orthogonal ($I_N$ and $I_S$) or diagonally orthogonal ($I_{E1}$, $I_{E2}$, $I_{W1}$, and $I_{W2}$) to the central power supply element. Thus, each power supply element may have a maximum of six neighbour power supply elements.

In step S220, the power supply element is configured to select a current value based on the received information, wherein the received information includes a current supplied by the other power supply elements.

The current value may be selected from a plurality of selectable current values, wherein the plurality of selectable current values comprise a range of stepped current values and wherein the current values are stepped by a predetermined interval. For example, the current values may begin at a current value representing a highest efficiency (and thus, lowest current value except for zero), and may be doubled each time until a current value representing a maximum current output is obtained. For example, the plurality of selectable current values may be 0, 1.25A, 2.5A, and 5A.

As discussed above, each power supply element may select a current value such that it is within a predetermined number of intervals of each neighbour power supply element. That is, it may be a requirement for the power provision device that the current provided by each power supply element is tied (or influenced by) to the current provided by neighbouring power supply elements (for example, power supply elements which are directly orthogonal to each other).

For example, Table 1 shows selectable current values for the example configuration shown in FIG. 3A.

| Adjacent converter values | | | | Possible values |
|---|---|---|---|---|
| $I_N$ | $I_W$ | $I_S$ | $I_E$ | $I_C$ values |
| 0 | 0 | 0 | 0 | 0, 1.25 |
| 0 | 0 | 0 | 1.25 | 0, 1.25 |
| 0 | 0 | 1.25 | 1.25 | 0, 1.25 |
| 0 | 1.25 | 1.25 | 1.25 | 0, 1.25 |
| 1.25 | 1.25 | 1.25 | 1.25 | 0, 1.25, 2.5 |
| 1.25 | 1.25 | 1.25 | 2.5 | 1.25, 2.5 |
| ⋮ | ⋮ | ⋮ | ⋮ | |
| 2.5 | 2.5 | 2.5 | 2.5 | 1.25, 2.5, 5 |

That is, the power supply element $I_C$ is limited to one interval above/below the neighbour power supply elements. For example, when the neighbour power supply elements are all providing 1.25A, $I_C$ is limited to selecting from current values 0, 1.25A, and 2.5A.

As such, each power supply element influences each other power supply element and, depending on where a load demand is at any given moment, the entire matrix of power supply elements is configured such that the load is more evenly distributed, preventing voltage drops across the power supply plane.

In step S230, the power supply element is configured to output a current corresponding to the selected current value.

That is, based on the received information, the power supply element selects a current to output to the power supply plane or load element.

Figure 4:
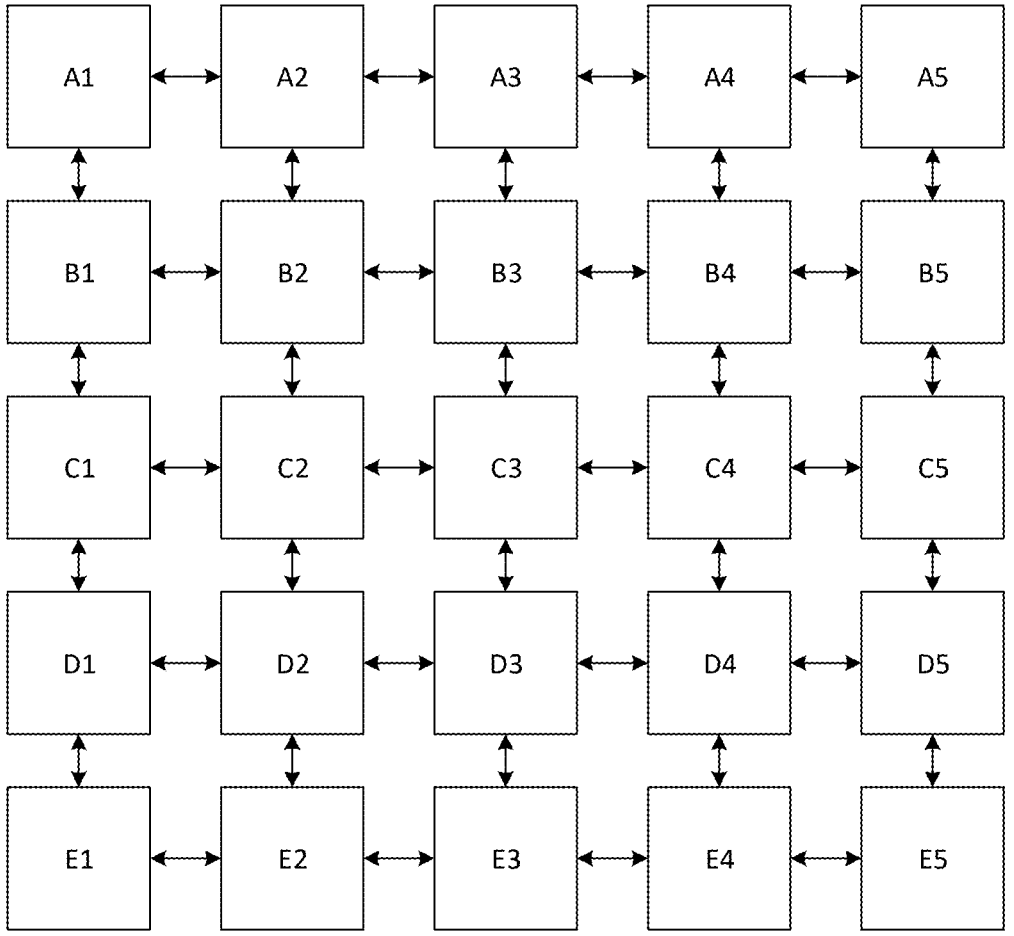
FIG. 4 is a diagram illustrating an example layout of a plurality of power supply elements.

FIG. 4 shows an example of a matrix of power supply elements. The matrix comprises twenty five power supply elements, wherein each power supply element is directly orthogonal to (and thus neighbours with) a maximum of four other power supply elements.

Power supply elements on the edge have three neighbour power supply elements, and power supply elements in the corners each have two neighbour power supply elements. These power supply elements, that have fewer than the maximum number of neighbour power supply elements, may act as though they have a maximum number of neighbour power supply elements, where missing neighbour power supply elements are treated as neighbour power supply elements supplying a maximum current value.

For example, power supply element A2 has only two actual neighbour power supply elements, A2 and B1, and is thus missing $I_E$ and $I_S$ (when considering the configuration shown in FIG. 3A). The inputs of the two missing power supply elements may be set to a maximum, such that power supply element is only influenced by A2 and B1 when selecting a current value.

Figure 5:
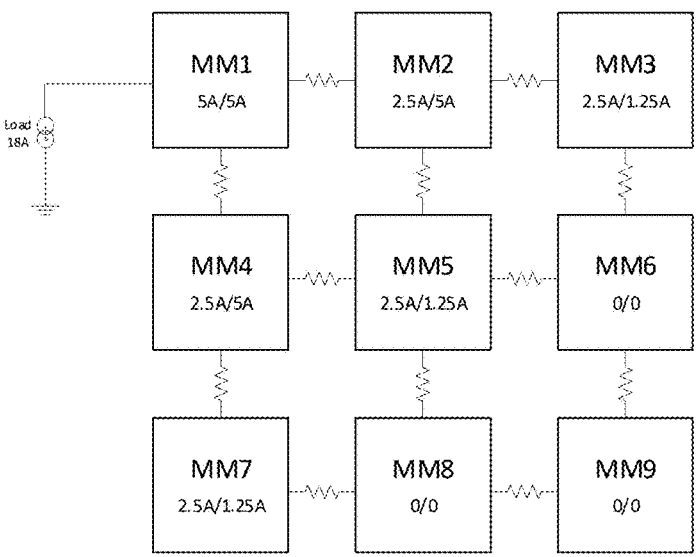
FIG. 5 is a circuit diagram illustrating an example layout of a plurality of power supply elements.

FIG. 5 shows an example of a matrix of nine power supply elements. FIG. 5 shows connections between the power supply elements, as well as example selectable current values for each power supply elements in the matrix. The matrix of power supply elements are connected by a mesh of resistors (a "resistive mesh").

FIG. 5 shows the special representation of the currents in the consecutive time slots, clearly showing that the distribution of the current settings depends on the resistive mesh that connects the converters and the position of the load current in the mesh.

Taking first the central power supply element MM5 (equivalent to $I_C$ in FIG. 3A, or any of B2 to B4, C2 to C4, or D2 to D4 in FIG. 4), the selectable current values available are 2.5A and 1.25A based on its neighbour power supply elements, MM2, MM4, MM6, and MM8.

The power supply element MM5 comprises connections to each neighbour power supply element, and a corresponding input port for each connection. This is shown in more detail in FIG. 6, which shows an example circuit diagram of a power supply element such as the power supply elements described with reference to FIGS. 1-5.

Figure 6:
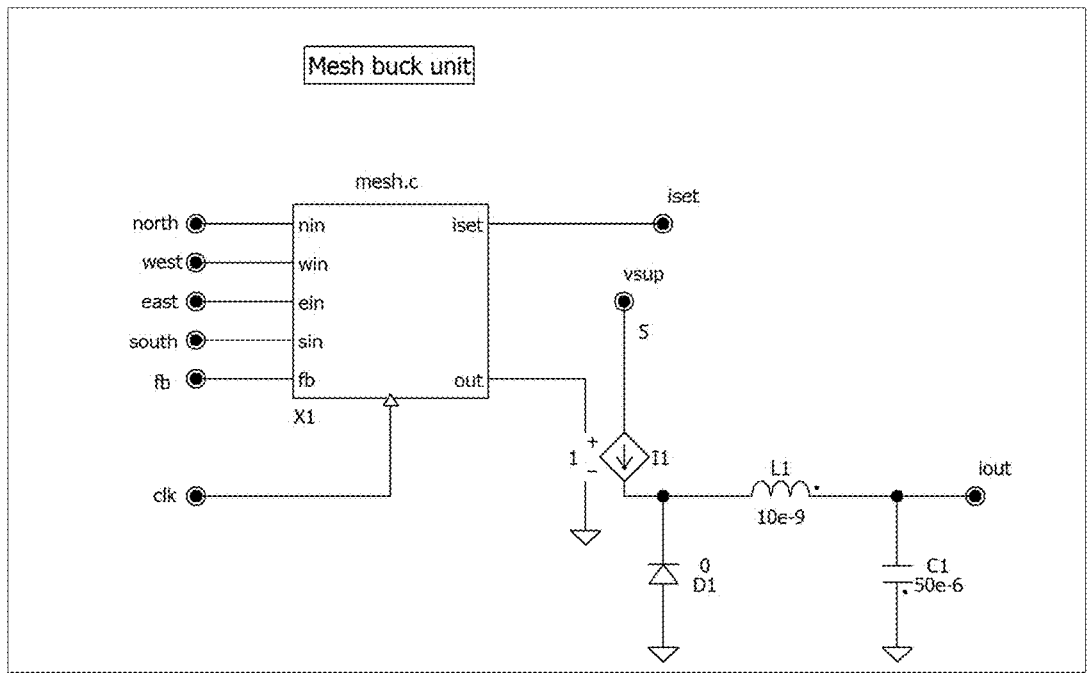
FIG. 6 is a circuit diagram illustrating a power supply element.

FIG. 6 shows a power supply element comprising five input ports, wherein the input ports include one input port for each neighbour (labelled north, west, east, and south) as well as a feedback input port that may be included to receive feedback signals from a feedback connection.

The input ports for each neighbour may be for receiving and transmitting information to and from the neighbour power supply elements. The number of input ports may correspond to a maximum number of neighbour power supply elements.

In the case that the power supply element is positioned on an edge of the matrix (for example, any of MM1, MM2, MM3, MM4, MM6, MM7, MM8, and MM9 of FIG. 5), unused inputs are set to a maximum value. For example, power supply element MM1 has two neighbour power supply elements, MM2 and MM4, and thus comprises two unused inputs which are set to 5A and 5A respectively. Thus, the unused inputs are prevented from influencing the current selected by MM1.

That is, when a power supply element has less than a maximum number of neighbours, the power supply element is configured to select a current value based on a maximum current value for each input port that is not connected to a neighbour power supply element.

Figure 7:
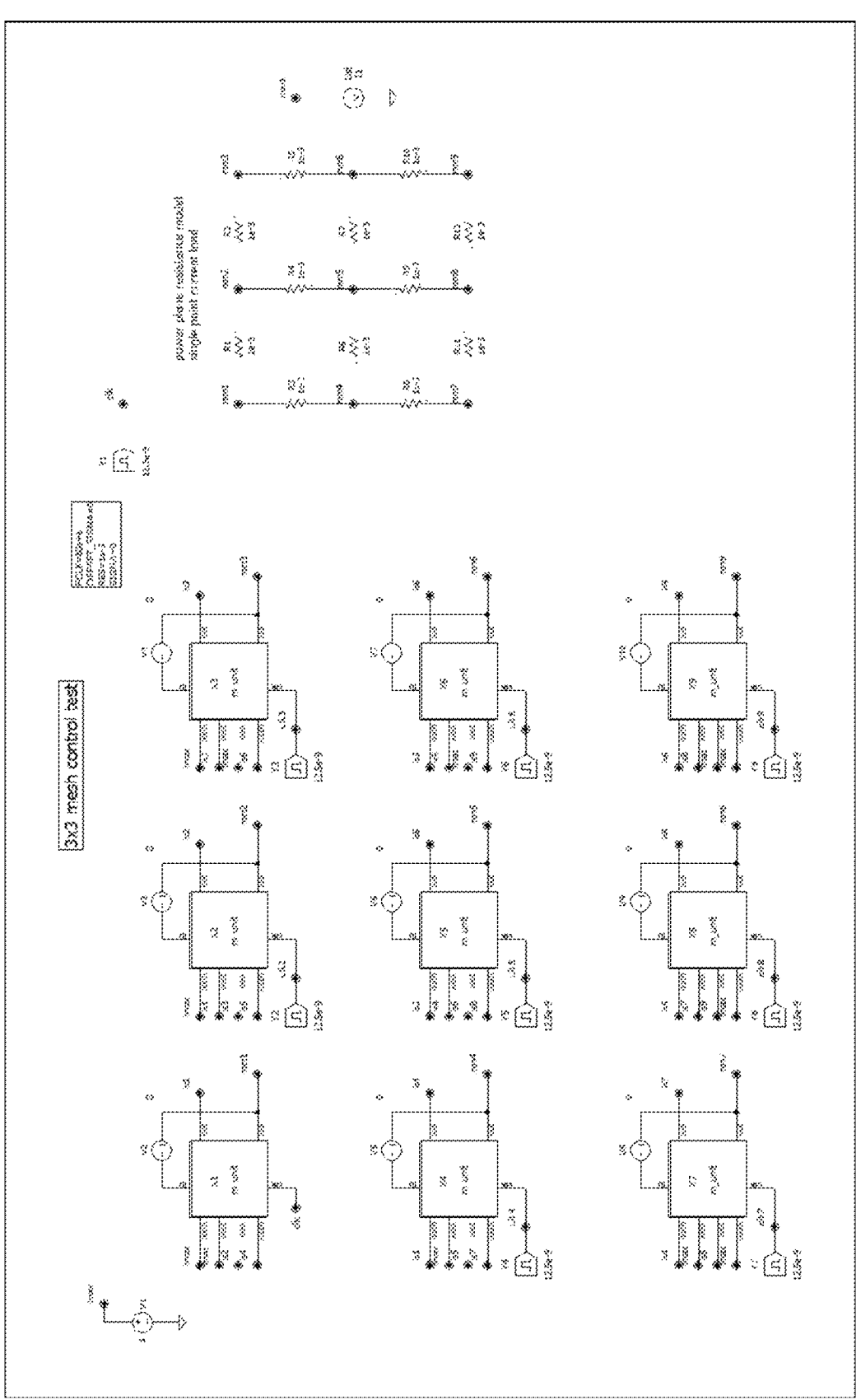
FIG. 7 is a diagram illustrating an array of power supply elements.

FIG. 7 shows a system modelled using NL5, comprising a 3×3 array (such as the array shown in FIG. 5, comprising a plurality of power supply elements such as those shown in FIG. 6 (or indeed described by reference to any of FIGS. 1-4)).

The array comprises nine nodes in a resistor mesh, wherein the load is applied to the corner node MM1. Each converter locally regulates its feedback to the node that the output is connected to using the feedback connection (as shown in FIG. 5). Due to the mesh resistance of the array, the voltage of MM1 can be expected to be lower than the neighbouring nodes, MM2, MM5, and MM4.

Each power supply element is modelled as a simple current source with an LC filter output. Example code for the controller of each power supply element is written in C and the listing is shown below.

It is a simple controller that sets an output current of the power supply element based on a comparison of the feedback voltage, fb, with a 1V fixed target voltage. The controller is configured, if fb is less than the target, to increase the current, or else decrease the current. This results in the output current toggling between two levels when the load is at an intermediate value.

Example C-code for the controller, 'mesh.c', wherein the internal 'iset' has decimal values (0,1,2,3) that define the output current level, and wherein the last statement converts this 'iset' to the converters output current (0, 1.25, 2.5, 5) is shown below:

```
//
// Mesh control
// iset=0, 1, 2, 3
// out=0, 1.25A, 2.5A, 5A steps
double imin;
init( )
{
    iset=0;
    out=0;
    imin=0;
}
main( )
{
    //get minimum input
    imin = min(nin, win, ein, sin);
    //set output on feedback
    if(fb<1 & iset <= 3)
    {
        iset = min(iset+1, imin+1, 3);
    }
    else
    {
        iset = max(iset-1, 0);
    }
    //set output current
    out = (iset == 3)? 5.0 : (1.25*iset);
}
```

For example, at 18A load on node MM1, the following converter currents are selected in two consecutive clock periods. This clearly shows the converter at MM1 supplies the highest current and the adjacent converters supply less, while the nodes furthest away from the MM1 are not being used. Table 2 shows the 'iset' and output current in brackets:

| Converter (node) | $I_{SET\_t}$ | $I_{SET\_t+1}$ |
|---|---|---|
| X1 (mm1) | 3 (5A) | 3 (5A) |
| X2 (mm2) | 2 (2.5A) | 3 (5A) |
| X3 (mm3) | 2 (2.5A) | 1 (1.25A) |
| X4 (mm4) | 2 (2.5A) | 3 (5A) |
| X5 (mm5) | 2 (2.5A) | 1 (1.25A) |
| X6 (mm6) | 0 (0) | 0 (0) |
| X7 (mm7) | 2 (2.5A) | 1 (1.25A) |
| X8 (mm8) | 0 (0) | 0 (0) |
| X9 (mm9) | 0 (0) | 0 (0) |
| total | 17.5A | 18.75 |

It should be noted that the control scheme for the current settings for each converter leads to a limit cycling regulation, such that some converters are stepping down (MM3) whilst other are stepping up (MM4) and the same time.

Various improvements and modifications can be made to the above without departing from the scope of the disclosure.

The invention claimed is:

1. A power provision device comprising:
   a load element;
   a power supply plane configured to provide current to the load element;
   a plurality of power supply elements configured to provide current to the power supply plane;
   wherein each power supply element is configured to provide a current corresponding to a plurality of selectable current values to the power supply plane via a power connection; and
   wherein each of the plurality of power supply elements comprises a controller configured to control the power supply element to:
      transmit information to and receive information from other power supply elements of the plurality of power supply elements;
      select a current value based on information received from other power supply elements, wherein the information includes a current supplied by the other power supply elements; and
      output a current corresponding to the selected current value.

2. The power provision device of claim 1, wherein the plurality of power supply elements are disposed on a single plane such that each power supply element has at least one neighbor power supply element;
   wherein a neighbor power supply element is a power supply element that is orthogonally and/or diagonally adjacent.

3. The power provision device of claim 2, wherein the plurality of selectable current values comprise a range of stepped current values;
   wherein the current values are stepped by a predetermined interval.

4. The power provision device of claim 3, wherein the current value is selected by each power supply element such that it is within a predetermined number of intervals of each neighbor power supply element.

5. The power provision device of claim 4, wherein the current value is selected by each power supply element such that it is at most one interval higher or lower than the current value provided by neighboring power supply elements.

6. The power provision device of claim 3, wherein a minimum selectable current value represents a maximum efficiency; and
   wherein a maximum selectable current value represents a maximum current output.

7. The power provision device of claim 2, wherein each power supply element comprises a plurality of input ports for receiving the information from neighbor power supply elements;
   wherein the number of input ports corresponds to a maximum number of neighbor power supply elements.

8. The power provision device of claim 7, wherein each power supply element has up to six neighbors.

9. The power provision device of claim 8, wherein when a power supply element has less than a maximum number of neighbors, the power supply element is configured to select a current value based on a maximum current value for each input port that is not connected to a neighbor power supply element.

10. The power provision device of claim 7, wherein the information is transmitted and/or received to and/or from neighbor power supply elements of neighbor power supply elements based on the information that is being transmitted and/or received.

11. The power provision device of claim 1, wherein the information includes at least one of: temperature data; current output data; and output voltage data.

12. The power provision device of claim 1, wherein the current value is selected based on a comparison between a voltage feedback signal and a predetermined target output current;

wherein the voltage feedback signal is received by the power supply element from a voltage feedback connection between the power supply element and the power supply plane or load element.

13. The power provision device of claim 7, wherein each power supply element has up to four orthogonally adjacent neighbor power supply elements.

14. A method of configuring a current output for a power supply element that is part of a plurality of power supply elements of a power provision device, the method comprising:

transmitting and receiving information from other power supply elements of the plurality of power supply elements; and selecting a current value based on the received information, wherein the information includes a current supplied by the other power supply elements;

outputting a current corresponding to the selected current value.

15. The method of claim 14, wherein the information is transmitted to and received from neighbor power supply elements;

wherein a neighbor power supply element is a power supply element that is orthogonally and/or diagonally adjacent to the power supply element.

16. The method of claim 15, wherein the information comprises data representing a state of the power supply element and a request to increase or decrease a current output by the neighbor power supply elements.

17. The method of claim 16, wherein the current output by the power supply element is limited by the current output by the neighbor power supply elements.

\* \* \* \* \*